US009158506B2

(12) United States Patent
Darke et al.

(10) Patent No.: US 9,158,506 B2
(45) Date of Patent: Oct. 13, 2015

(54) LOOP ABSTRACTION FOR MODEL CHECKING

(71) Applicant: Tata Consultancy Services Limited, Mumbai (IN)

(72) Inventors: Priyanka Dilip Darke, Pune (IN); Bharti Dewrao Chimdyalwar, Pune (IN); Venkatesh R, Pune (IN); Ulka Aniruddha Shrotri, Pune (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/633,228

(22) Filed: Feb. 27, 2015

(65) Prior Publication Data

US 2015/0242188 A1 Aug. 27, 2015

(30) Foreign Application Priority Data

Feb. 27, 2014 (IN) .............................. 704/MUM/2014

(51) Int. Cl.
*G06F 9/44* (2006.01)
*G06F 11/36* (2006.01)

(52) U.S. Cl.
CPC .............. *G06F 8/30* (2013.01); *G06F 11/3608* (2013.01)

(58) Field of Classification Search
CPC ....................................................... G06F 8/30
USPC .................................................. 717/106–123
See application file for complete search history.

(56) References Cited

U.S. PATENT DOCUMENTS

| 7,853,906 | B2 | 12/2010 | Ganai et al. | |
| 7,921,411 | B2 | 4/2011 | Chockler et al. | |
| 8,087,010 | B2 * | 12/2011 | Eichenberger et al. | 717/150 |
| 8,601,459 | B2 * | 12/2013 | Sankaranarayanan et al. | 717/160 |
| 8,719,793 | B2 | 5/2014 | Maeda et al. | |
| 2005/0273769 | A1 * | 12/2005 | Eichenberger et al. | 717/136 |
| 2011/0078665 | A1 * | 3/2011 | Gulwani et al. | 717/131 |
| 2013/0227537 | A1 * | 8/2013 | Sankaranarayanan et al. | 717/160 |

OTHER PUBLICATIONS

Jain Himanshu, et al. "Using statically computed invariants inside the predicate abstraction and refinement loop." Computer Aided Verification. Springer Berlin Heidelberg, 2006, pp. 137-151.*
Ball, Thomas, et al. "Automatic predicate abstraction of C programs." ACM SIGPLAN Notices. vol. 36. No. 5. ACM, 2001, pp. 203-213.*

(Continued)

*Primary Examiner* — Satish Rampuria
(74) *Attorney, Agent, or Firm* — Schwegman Lundberg & Woessner, P.A.

(57) ABSTRACT

Loop abstraction includes determining an original loop within the source code. The original loop includes a control statement and a loop body such that the original loop causes the loop body to be repeatedly executed based on the control statement. Further, output variables in the original loop and a number of blocks associated with the original loop are identified. The number of blocks is indicative of a count of unconditionally executed statement sets in which at least one output variable is computed. An abstract loop corresponding to the original loop is generated by adding a modified expression for accelerated assignment for each output variable in a subset of the output variables, and replacing the control statement with a bounded control statement. The original loop is replaced with the abstract loop for generating an abstract source code for the model checking.

20 Claims, 2 Drawing Sheets

(56) References Cited

OTHER PUBLICATIONS

Bishop, Judy M. "The effect of data abstraction on loop programming techniques." Software Engineering, IEEE Transactions on 16.4 (1990), pp. 389-402.*

Blanc, Regis, et al., "ABC: Algebraic Bound Computation for Computer Science Loops", *Lecture Notes in Computer Science*, vol. 6355, (2010), 103-118.

Darke, Priyanka, et al., "Precise Analysis of Large Industry Code", *2012 19th Asia-Pacific Software Engineering Conference (APSEC)*, (2012), 1-4.

Donaldson, Alastair F., et al., "Software Verification using κ-Induction", *In Proceedings of the 18th International Static Analysis Symposium (SAS'11)*, vol. 6887 of *Lecture Notes in Computer Science*, (2011), 351-368.

Gonnord, Laure, et al., "Combining Widening and Acceleration in Linear Relation Analysis", *Lecture Notes in Computer Science*, vol. 4134, (2006), 17 pgs.

Jeannet, Bertrand, et al., "Abstract Acceleration of General Linear Loops", *Principles of Programming Languages, ACM*, 49(1), (Jan. 2014), 529-540.

Kroening, Daniel, et al., "Under-Approximating Loops in C Programs for Fast Counterexample Detection", *Lecture Notes in Computer Science*, vol. 8044, (2013), 17 pgs.

Kroening, Daniel, et al., "Verification and falsification of programs with loops using predicate abstraction", *Formal Aspects of Computing*, 22(2), (2010), 105-128.

Post, Hendrik, et al., "Reducing False Positives by Combining Abstract Interpretation and Bounded Model Checking", *23rd IEEE/ACM International Conference on Automated Software Engineering, (ASE 2008)*, (2008), 188-197.

Schrammel, Peter, et al., "Applying abstract acceleration to (co-)reachability analysis of reactive programs", *Journal of Symbolic Computation*, 47, (2012), 1512-1532.

Vujošević-Janičić, Milena, et al., "Development and Evaluation of LAV: An SMT-Based Error Finding Platform—System Description", *Proceedings of the 4th International Conference on Verified Software: Theories, Tools, Experiments (VSTTE'12)*, (2012), 98-113.

\* cited by examiner

LOOP ABSTRACTION FOR MODEL CHECKING

CLAIM OF PRIORITY

This application claims the benefit of priority of India Patent Application No. 704/MUM/2014, filed on Feb. 27, 2014, the benefit of priority of which is claimed hereby, and which is incorporated by reference herein in its entirety.

FIELD OF INVENTION

The present subject matter relates to data abstraction for model checking and, particularly but not exclusively, to loop abstraction in a computer program for model checking.

BACKGROUND

A computer program is a sequence of codes written in a programming language to perform a specified task in a computing device, such as a computer and a laptop. The computer program, also referred to as a program, usually includes one or more execution statements that are executed for performing the specified task. The statements are generally provided in a sequential form with the program execution beginning from execution of a first statement and ending with execution of a last statement. However, in complex programs, the statements may be provided in the form of loops such that a particular set of statements is executed in a given sequence repeatedly until a loop termination condition is reached. On execution of the last sequential statement in such cases, it is first determined whether the termination condition has been achieved or not. If the termination condition is not achieved, the given sequence starting from the first statement is executed again, otherwise the loop in the program is terminated. Further, a loop may be configured to run for a specified loop bound. The loop bounds may be understood as the maximum number of times a loop has to be executed.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example, and with reference to the accompanying figure(s), in which.

DETAILED DESCRIPTION

Figure 1:
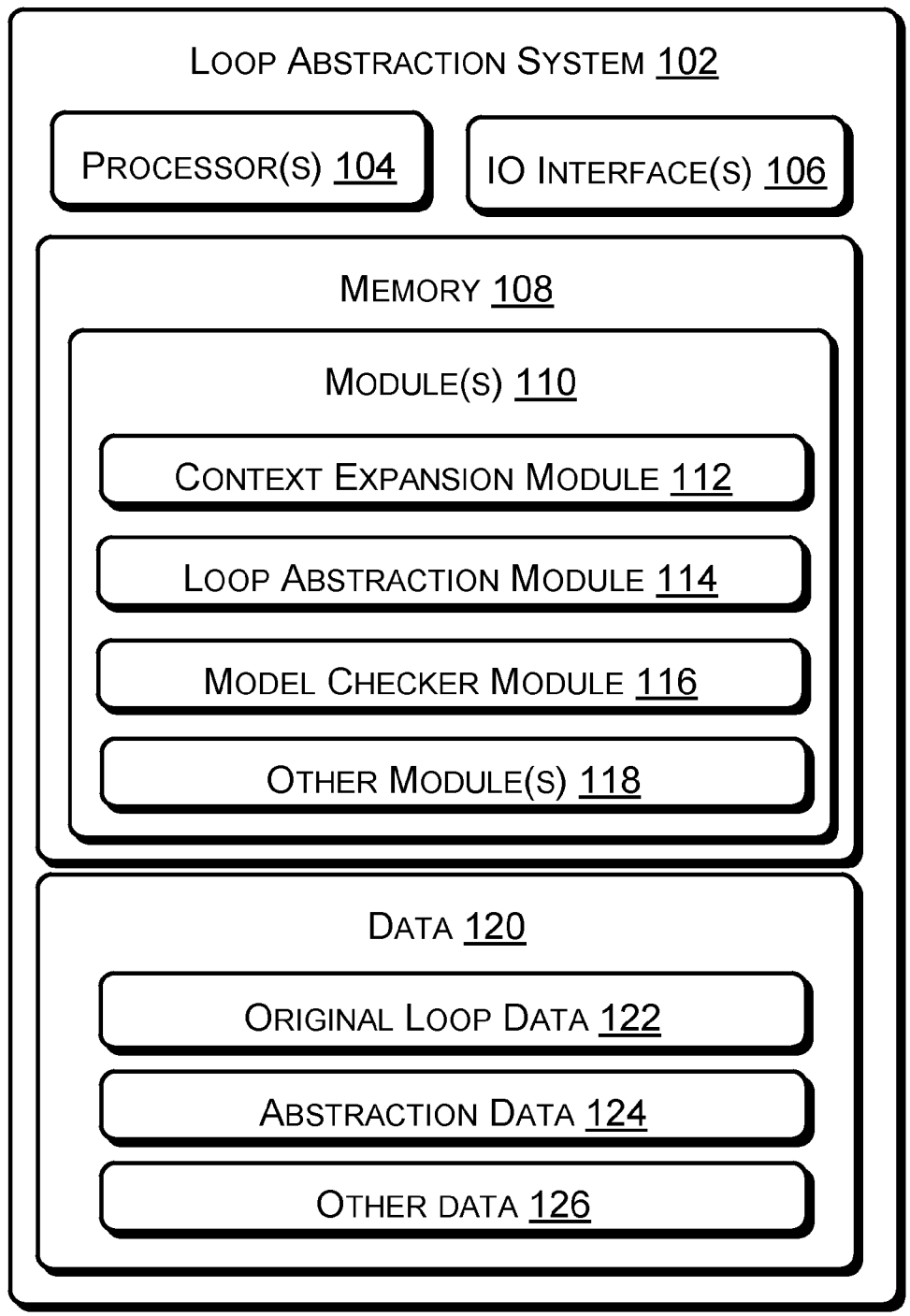
FIG. 1 illustrates a network environment implementing a loop abstraction system, according to an implementation of the present subject matter.

While executing programs having loops, errors may be encountered in cases of indefinite loops or loops having large loop bounds. Generally, in order to ensure error free execution of the program, the program is initially checked for errors, for example, by a program analyzer or a model checker of the computer device. The model checker is configured to analyze the program and check for various errors that may occur on execution of the program. However, for the loops with non-deterministic bounds i.e. indefinite or large loop bounds, the model checker ascertains a small upper bound and unrolls the loops in accordance with the upper bound. Further, ascertaining the upper bound may be a time consuming and difficult task for the model checker as the model checker may lack sufficient intelligence for ascertaining such a bound. Thus, providing an inadequate, i.e., a smaller bound than required may cause a bounded model checker to produce results, such as a loop unrolling assertion failure. Additionally, in both the cases of a smaller bound and a larger bound the model checker may produce an "out of memory" failure. Therefore it may not be feasible to verify loops having indefinite or large bounds using a bounded model checker.

Other conventional techniques involve loop abstraction for model checking and verification. One such approach relates to loop abstraction based on number of transitions that a loop goes through. Abstracting loops based on the number of transitions may however not be efficient for indefinite loops as in such cases the number of transitions may not be determined accurately, thus affecting the efficiency of model checking.

Another conventional technique of loop abstraction involves unrolling a given loop twice. Initially, the given loop is unrolled n number of times followed by resetting all variables updated in the loop body during the unrolling. The loop is subsequently unrolled m number of times. However, using the present technique may not be useful for verifying certain loops having complex conditions as all the variables updated during loop unrolling are not reset in each iteration of the loop unrolling, thus affecting subsequent unrolling. Further, the value of m is a configurable parameter and is not evaluated for efficiency. The model checker may thus either run out of memory or cause loop unwinding assertion failures.

Yet another conventional technique involves predicate abstraction for verification. The predicate abstraction typically involves mapping concrete data types to abstract data types through predicates over the concrete data. However, using predicate abstraction for large programs may be infeasible due to the computational costs associated with the technique.

Thus, in the process of verification of computer programs with loops having non-deterministic bounds, a need for an efficient and lesser time consuming mechanism to abstract the loops with non-deterministic bound without memory or processing errors exists.

According to an implementation of the present subject matter, systems and methods for abstracting a loop in a source code for model checking of the source code are described. The source code may be understood as a computer program written in a programming language. The systems and methods can be implemented in a variety of computing devices. The computing devices include, but are not limited to, desktop computers, hand-held devices, laptops or other portable computers, and the like. In one implementation, the systems and methods implementing loop abstraction may be provided for loop abstraction and subsequent model checking in programs written using programming languages including, but not limited to, C, C++, VC++, C#, and the like.

In one implementation, the source code received for abstraction may be analyzed to determine an original loop having a loop body and a control statement. Further, output variables and number of blocks associated with the original loop are also identified. Furthermore, an abstract loop corresponding to the original loop may be generated. For this, a modified expression for accelerated assignment of each output variable in a first subset of the output variables is added before the loop body. Additionally, the loop control statement may be replaced with a bounded control statement which includes the loop control statement. Further, a count of a second subset output variable may also be considered for bounded control statement. The method further replaces the original loop with the abstract loop to generate an abstract source code for model checking. Here, the first subset of the output variable corresponds to input-output variables (IO) and the second subset of the output variable corresponds to pure output variables.

The control statement in the original loop may be understood as the termination condition for the original loop. The original loop can include a plurality of variables that may be read, used, or modified during loop execution. The loop variables may be further classified as input variables, pure output variables, and input-output (IO) variables. The input variables are the variables that are read only, i.e., just provide input to the original loop, and are thus not modified during loop execution. The pure output variables on the other hand are the ones that are only modified during the loop execution and also used outside the loop. The IO variables are the ones that are used for providing input and are modified during the loop execution.

In one implementation, a loop in a computer program, such as C Program, is abstracted. In order to abstract the loop in the computer program, each property to be verified, referred to as 'a', can be determined and may be modelled as an assertion. Further, the computer program is sliced with respect to the property 'a' and the reduced sliced computer program is used for verification of the property 'a'. Further, an iterative context expansion module verifies the property 'a' of the computer program. In the verification process, a function 'f' in which assertion 'a' lies is selected as the starting context for analysis of the computer program. Furthermore, loops with large and unknown bounds from the function 'f' are abstracted and the abstracted computer program is analyzed using a model checker. If the model checker reports the property 'a' of the computer program as safe then it can safely conclude that the property 'a' is safe in the computer program. If the model checker reports the property 'a' of the computer program as unsafe then the context is widened to the functions that call T. The model checker reporting process is repeated until either the property 'a' of the computer program is proved to be safe or the model checker does not scale up or the property 'a' of the computer program is proved to be unsafe at the top level function.

Further, the present loop abstraction process uses loop replacement to transform loops with large or unknown bounds when the assertion is outside the loop body of the computer program and uses induction when the assertion is within the loop body of the computer program. Also, nested loops of the computer program are abstracted starting from the innermost loop body and proceeding to the outermost loop body of the computer program. According to an implementation, flags can be used to determine if the assertion is present inside the loop body or outside it.

Further, in both transformations, each IO variable is abstracted by assigning a non-deterministic value to it at the start of the abstract loop. An IO variable is a variable that is first read and then modified along some path of the loop body. For a variable that participates in a linear recurrence equation, the non-deterministic assignment to it is the closed form acceleration for a non-deterministic number of iterations of its assignment. Mutual recurrences are also handled similarly, when more than one recurrent variable have mutual dependency.

The systems and methods of the present subject matter thus facilitate in implementing loop abstraction process in a program. The original loop is replaced by another loop which has a small known bound which ensures that the loop is executed only a fixed number of times thus reducing the costs associated with memory resource, processing resource, and time consumption and errors, such as memory overflow or loop unwinding assertion failures caused due to execution of loops having indefinite or large loop bounds. Further, the computer program may be abstracted into another computer program which allows all runs of the original computer program along with additional runs. Such an abstracted computer program may be called as an over-approximation of the original computer program. Therefore, if a property of the computer program is valid in the abstracted computer program, then it will also hold in the original computer program. Furthermore, when an assertion is safe in the computer program and if after applying the loop abstraction process, the model checker returns the assertion to be safe then the original computer program is safe with respect to that assertion.

These and other advantages of the present subject matter would be described in greater detail in conjunction with the following figures. While aspects of described systems and methods for loop abstraction in a program can be implemented in different computing systems, environments, and/or configurations, the implementations are described in the context of the following exemplary system(s).

FIG. 1 illustrates exemplary components of a loop abstraction system 102 implementing loop abstraction in a program written in a programming language, in accordance with an implementation of the present subject matter. The loop abstraction system 102 may be implemented in a computing device 128. Examples of the computing device 128 include, but are not limited to, mainframe computers, workstations, personal computers, desktop computers, minicomputers, servers, multiprocessor systems, laptops, a cellular communicating device, such as a personal digital assistant, a smart phone, and a mobile phone; and the like. The loop abstraction system 102, implemented using the computing device 128, includes one or more processor(s) 104, TO interface(s) 106, and a memory 108 coupled to the processor 104. The processor 104 can be a single processing unit or a number of units. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor 104 is configured to fetch and execute computer-readable instructions and data stored in the memory 108.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or customized, may also be included.

The IO interfaces 106 may include a variety of software and hardware interfaces, for example, interface for peripheral device(s), such as a keyboard, a mouse, an external memory, and a printer. Further, the IO interfaces 106 may enable the computing device to communicate with other computing devices, such as a personal computer, a laptop, and like.

The memory 108 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 108 also includes module(s) 110 and data 120.

The module(s) 110 include routines, programs, objects, components, data structures, etc., which perform particular tasks or implement particular abstract data types. The module(s) 110 further include a context expansion module 112, a loop abstraction module 114, a model checker module 116 and other module(s) 118. The other module(s) 118 may include programs or coded instructions that supplement applications and functions of the computing device.

On the other hand, the data 120, amongst other things, serves as a repository for storing data processed, received, and generated by one or more of the module(s) 110. The data 120 includes, for example, original loop data 122, abstraction data 124, and other data 126. The other data 126 includes data generated as a result of the execution of one or more modules in the other module(s) 118.

In one implementation, the computing device is configured to abstract loops included in a source code also referred to as a program. For the purpose, the program is initially received by the context expansion module 112. In one implementation, the context expansion module 112 may receive the program from a compilation module (not shown) internal to the computing device. In another implementation, the context expansion module 112 may receive the program from a compilation module (not shown) external to the computing device.

On receiving the program, the context expansion module 112 saves the program in the original loop data 122 and analyzes syntax of the program to identify an original loop for which the loop abstraction may be performed. The original loop may include an original loop body and an original loop statement. The original loop statement may be defined as the statement in the program that is provided to initiate a loop. The original loop statement is also referred to as control statement. The original loop statement typically includes, among other things, a termination condition for the original loop. For example, in a "for" loop, the first statement "(for i=0; i<10; i++)" defining the "for loop" may be referred to as the original loop statement. Further, the original loop body may be defined as a set of one or more statements involving loop variables that are executed during the loop execution. For instance, in the previous example of the program received by the computing device 102, the context expansion module 112 may select the function call context for which the abstraction is to be carried out and can pass it to the loop abstraction module 114, which can abstract the original loop and pass the abstracted loop to the model checker 116. Further, the context expansion module 112 may also be responsible for the expansion of the context if the assertion cannot be verified using that context as discussed later.

In one implementation, the loop abstraction module 114 is configured to replace the original loop with the abstracted loop to generate an abstracted source code. In one implementation, the loop abstraction module 114 may generate an abstract computer program by abstracting the loops present in the given context. The loop abstraction module 114 may take as input the function for analysis, and may obtain the function call context and output variables present in the original loop from the context expansion module 112. To generate the abstract loop, the loop abstraction module 114 can add a modified expression for accelerated assignment of each output variable in a subset of the output variables. The modified expression can be added before the loop body. The loop abstraction module 114 can further replace the control statement in the original loop with a bounded control statement. The bounded control statement can include a small known upper bound computed based on the number of blocks or the number of pure output variables. Further, the loop abstraction module 114 can replace the original loop with the abstract loop to generate an abstract source code for the model checking. Here, the accelerated assignment indicates replacing the output variable with an abstracted output variable that has a value corresponding to a an iteration greater than the iteration being tested. Further, based on the variable being non-recurrent, self recurrent and the like, the accelerated assignment may vary, as discussed later. In other implementations, methods known in the art may also be used for accelerated assignment.

For an example, an original loop is provided below which is transformed into an abstracted loop which is an over-approximation of the original loop. The exemplary loop abstraction process (LA) is explained as follows:

| Case 1: Property to be verified is inside the loop | |
|---|---|
| while ( c ) | if( c ) Loop__body //base__case with<br>    property assertion //first loop<br>iteration |
| { | for( i=0 ; i<min(b, po) && c; i++ )<br>  {<br>    abstract( IO );<br>    assume( c && r && a);<br>    Loop__body; //induction hypothesis<br>    //- assuming<br>    //the input property to<br>    //be verified<br>  }<br>if( c ) Loop__body; // last loop iteration<br>    //with property<br>    // assertion<br>assume(!c); |
| Loop__body with<br>property assertion | |
| } | |
| Exp.1.1: Before Loop Abstraction (LA) | Exp.1.2: After Loop Abstraction (LA) |

| Case 2: Property to be verified is outside the loop | |
|---|---|
| while ( c ) | for( i=0 ; i<min(b, po) && c; i++ ) |
| { | {<br>  abstract( IO );<br>  assume( c && r && a);<br>  Loop__body; |
| Loop__body; | |
| }<br>Assert property; | }<br>assume(!c);<br>Assert property; |
| Exp.1.3: Before Loop abstraction | Exp.1.4 After Loop Abstraction |

Here, in examples 1.1-1.4,
c—loop condition.
Loop_body—input loop body.
b—number of blocks in the loop body modifying a unique set of output variables.

Here, the number of block may indicate a count of unconditionally executed statement sets. For example:

```
while( c) {
If(c1){
            Stmt1; //modifying s1
    }
If(c2) {
    Stmt1; //modifying s2
}
While(c4) { // nested loop
        Stmt3; //modifying s3
}
        Stmt4; //modifying s4
}
```

Here, the number of blocks would be four, as one block each is associated with the two if-condition statements, one block is with the inner loop (nested loop) and one block is with outer loop.

An output variable is a variable that is read and modified in the loop, or modified in the loop body and is used after the loop. IO—the set of variables that along some path are read first and then modified in the loop body abstract(IO)—is a set of assignments that over approximates the IO variables of the loop. For a recurrent variable (which is recursively using itself) this assignment is an abstract recurrence relation if the recurrence relation of that variable can be obtained. If the recurrence relation of that variable cannot be obtained then abstract(IO) represents the assignment of a non-deterministically selected value to it. If the IO variable is not recurrent then one of the possible values that that variable can attain in any of the loop iterations is assigned to it or a non-deterministically selected value is assigned to it.

r—is a condition which constrains the value ranges of all output variables of the loop.

a—is a condition which constrains the values of the output variables by creating conditions on the number of times each block in the loop body was executed.

min(b. po)—is the minimum of the number of blocks and pure output variables of the original loop. If there are no pure output variables, min(b,po) returns 1.

Exp. 1.1 contains the original input loop, Exp. 1.2 contains the corresponding abstraction of the loop when the assertion of the input property is present in the loop body. Exp. 1.3 contains original input loop body and Exp. 1.4 contains the abstraction when the assertion is not present in the loop body. Therefore, loop abstraction, abstract recurrences and induction are applied to prove a property when the assertion is present inside the loop body and when the assertion is not present in the loop body then only loop abstraction and abstract recurrences are applied to abstract the loop. Further, the loop abstraction module may generate the assertion and then determine if the assertion is present inside or outside the loop body. Here, if the assertion is present inside the loop body the flag is set for induction.

Further, the computer program with the abstracted loop thus obtained may be saved by the loop abstraction module 114 in the abstraction data 124. Further, the program with the abstracted loop may be provided to the model checker module 116 for being analyzed for errors. Providing the program with the abstracted loop to the model checker module 116 helps in facilitating the abstract program with abstract loops and the input function for analysis and checks if the input assertion or property of the computer program is safe or not. If it is safe, then the process is stopped otherwise it produces a trace.

Although the present subject matter has been defined with reference with to a "while loop" and a "for loop", it will be understood that the computing device 102 implementing the loop abstraction may be used for loop abstraction in other types of loops as well, albeit with few modifications/alterations as will be understood by a person skilled in the art.

Although the present subject matter has been defined in reference with loops used in c language, it will be understood that the computing device implementing the loop abstraction may be used for loop abstraction in programs written using other programming languages, albeit with few modifications.

Figure 2:
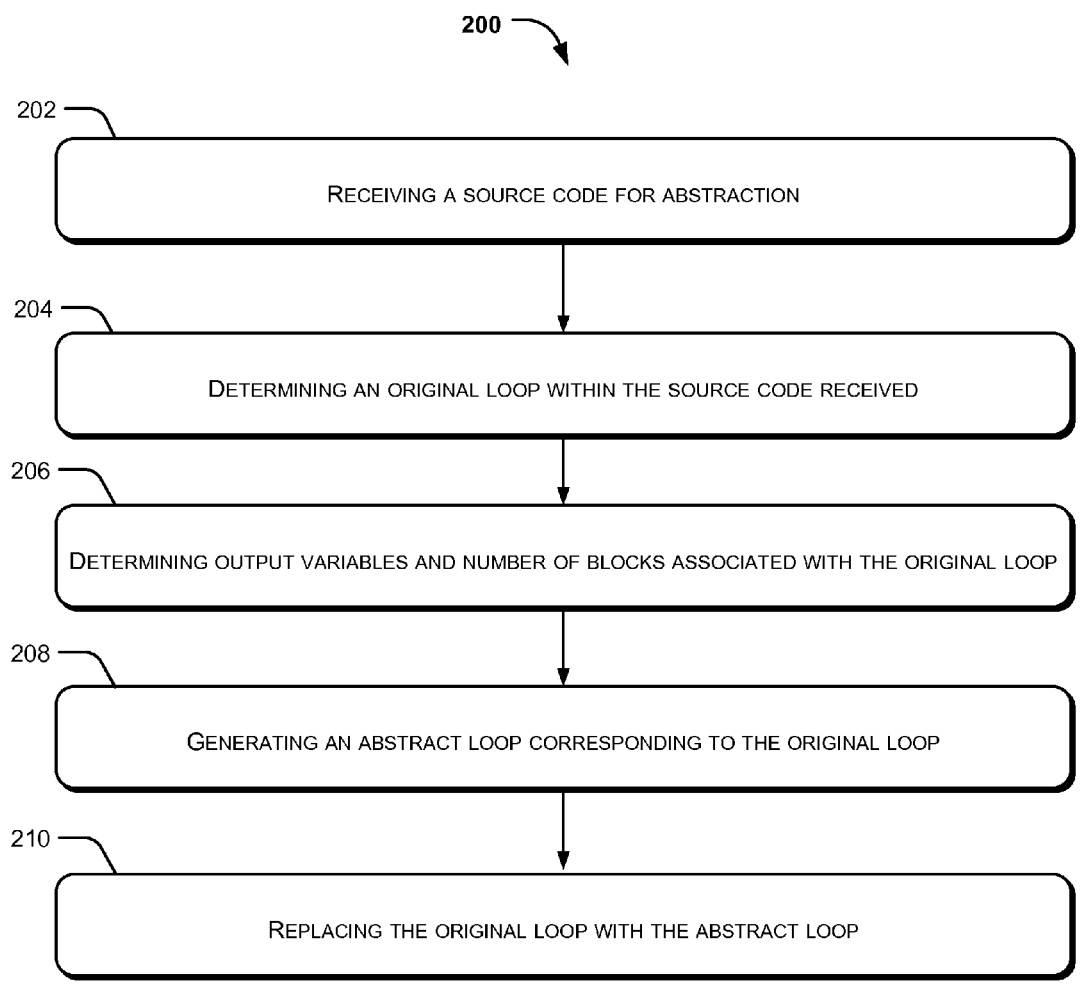
FIG. 2 illustrates a method for abstracting a loop in a source code, according to an implementation of the present subject matter.

Further, FIG. 2 illustrates an example method 200 of abstraction of loops for model checking of the computer program. In the method 200, at block 202 a source code or computer program may be received by the context expansion module 112, for abstraction. Further, at block 204 an original loop with control statement and a loop body for the original loop may be determined by the context expansion module 112. Furthermore, at block 206 output variables and the number of block associated with the original loop may be determined by the context expansion module 112. Here, the output variables include pure output variable and input-output variable both. Next, at block 208 an abstract loop corresponding to the original loop may be generated by the loop abstraction module 114. The abstract loop generated may at least be based on adding a modified expression for accelerated assignment for each output variable in a subset of the output variables. Here, the modified expression would be added before the loop body. Additionally, replacing the control statement with a bounded control statement. Here, the bounded control statement includes an upper bound based on the number of blocks.

At block 210 the original loop in the source code may be replaced by the abstract loop generated at block 208, by the loop abstraction module 114. The method 200 is further described in detail below with the help of examples.

For example, in the loop abstraction process, loop replacement replaces each loop, may be called as 'L', having a large or unknown bound and not containing the assertion, by another loop L0, with a small finite number of iterations determined by the number of blocks in the loop's body or the number of pure output variables. An auxiliary variable is introduced corresponding to each block representing the number of iterations of that block. All output variables in the loop L are abstracted or accelerated in the replaced loop L0. Induction is used for loops where assertion is within the loop body. The loop is replaced by three copies of its body—one for the base case, second corresponding to the $k^{th}$ iteration and third for the $(k+1)^{th}$ iteration for induction. If the assertion 'a' is not violated at the end of the first iteration, it holds for the base case of the loop body. At the start of the copy for the $k^{th}$ iteration all output variables are abstracted or accelerated. At the end of the $k^{th}$ iteration, the property to be verified is assumed to hold as the induction hypothesis. The $(k+1)^{th}$ iteration again has the original loop body with inner loops replaced and the assert. Since the loop abstraction process assigns non-deterministic or accelerated or abstracted values to all output variables at the start of the loop body of the computer program. Thus, the program code generated after applying loop abstraction process is a sound over-approximation of the original code.

Further, different types of recurrence relations, may be called as abstract acceleration relations, and abstraction rela tions can be generated for non-recurrent, self recurrent, and other IO variables their values as follows:

Accelerated Assignment example 1: A non-recurrent IO variable, i, is a variable modified under some condition only in the functions like, $i=\gamma$, i.e. a reset expression. Here, $\gamma$ may indicate constants or input variables.

Accelerated value of $i_k$ may be $$i_k = i_0 \| \gamma_1 \| \gamma_2 \ldots \| \gamma_r$$

$i_0$ is initial value of i before execution,
r is the number of reset expressions of i,
$\gamma_i$, $1 \le i \le r$ corresponds to reset expression of i Accelerated Assignment example 2: A self recurrent IO variable, i, is a variable modified under some condition in the functions like, $i=i+\beta$, i.e. a self recurrence expressions.
$\beta$ is a constant or an input.

Accelerated value may be, $$i^k = i^0 + \Sigma_{i=1}^{e} k_i \beta_i,$$

$i^k$ is the value of variable i after k iterations
$i^0$ is the initial value of i
e is the number of expressions that modify i
$k_1, k_2, \ldots k_e$ are an abstraction of the number of times the respective expression was executed in the original loop. Therefore, $$k_i \le k$$

Accelerated Assignment example 3: In a loop body, along some path variable o is modified in expressions of form $o=o+c_1$ and along some other path it is reset with an expression of form $o=c_2$. Here, $c_1$ and $c_2$ are constants or inputs (variables that are never modified in the loop) for a given loop. Let $o_k$ be the value of o after k iterations, then $$o_k = o_0 + k_1 * c_1 \| c_2 + k_2 * c_1$$

Here, $o_0$ is the initial value of o and $k_1$, $k_2$ are the number of times the corresponding expressions were executed before the reset and after the last reset. This formula can be extended to more expressions in the loop of the form $o=c_i$.

Accelerated Assignment example 4: In a loop body, along some path variable o is modified in expressions of form $o=o+c_1$ and along some other path it is reset with expression of form $o=io$. Here, $c_1$ is constant and io is an IO variable. Let $o_k$ be the value of o after k iterations, then $$o_k = o_0 * k_0 + p_1 * c_1 + p_2 * c_2 + \ldots + p_e * c_e + k_1 * io_1\_0 + k_2 * io_2\_0 + \ldots + k_d * io_{dv}\_0 + q_1 * io_1\_0 + q_2 * io_2\_0 + \ldots + q_d * io_{db}\_0$$

Here $o_0$ is the initial value of o and $k_0$ is either 0 or 1 depending on whether $o_k$ is reset or not during the actual execution of the loop. $c_i$ are constants which are used in definition of $o_k$ and e is number of such expressions. dv is the number of variables on which the value of $o_k$ depends transitively but is not mutually recurrent with it. $io_i\_0$ are the initial values of those variables. db is the number of constants or inputs on which the value of o depends transitively and $io_j\_0$ are those corresponding variables. $k_i$, $q_i$ and $p_i$ are non-deterministically assigned values.

Accelerated Assignment example 5: Consider a variable $io_1$ and $io_2$ is modified along some paths (conditionally) in a loop body in expressions of the form $io_1 = io_1 + io_2 + c1$ and $io_2 = io_1 + c2$ where $io_1$, $io_2$ are IO variables and c1, c2 are constant expressions. Here, both $io_1$ and $io_2$ depend on each other, hence, it is mutual recurrence relationship.

Let $io_i^k$ be the value of $io_1$ after k iterations, then $$io_1^k = k_1 * io_1\_0 + k_2 * io_2\_0 + \ldots + k_d * io_d\_0 + p_1 * c_i + p_2 * c_2 + \ldots + p_e * c_e$$

Here, d is the number of variables on which $io_1$ has transitive dependency (including itself). e is number of constants or input variables on which $io_1$ has a transitive dependency. The constants, $k_i$, $p_i$ are non-deterministically assigned values. $io_d\_0$ represents the initial value of the IO variable $io_d$. $c_1, c_2 \ldots, c_e$ are constants or inputs on which $io_1$ has a transitive dependency.

Accelerated Assignment example 6: In an implementation when arrays are modified inside a given loop body, the system generates non-deterministic values for all the array elements, for all the implementations of those array elements outside the loop body.

Accelerated Assignment example 7: In an implementation when pointers are modified inside the loop body, the system determines all the memory locations pointed by the pointers and generates the abstraction of the memory locations, in a manner similar to abstraction for the variables. However, if the memory location to the information for any of the pointer in the loop body cannot be resolved, non-deterministic assignments for all the output variables may be generated.

In one implementation, for nested loop, abstraction starts from inner most loop. The abstraction of inner loop is enclosed in abstraction of the outer loop.

```
while( c )                      for(i  =0;  i<min(b__outer,
{                                po__outer) & c ;i++)
  Outerloop stmts;              {
  while( ic) {                    abstractouter(IO);
    Inner loop stmts              assume( c && r__outer
  }                                 && a__outer);   Outerloop
}                                 stmts;
                                  for(i  =0;  i<min(b__inner
                                    && po__inner & ic ;i++){
                                    abstractinner(IO);
                                    assume( ic && r__inner &&
                                      a__inner);      inner loop
                                    stmts;
                                  }
Example 6 - Original loop        assume(!ic);
                                }
                                assume(!c);
                                Example 7 - Abstract Loop
```

Consider nested structure of loops shown in Exp. 6. Exp. 7 shows abstraction of this loop. Firstly, inner loop then outer loop is abstracted using loop abstraction module 114. While abstracting outer loop, inner loop is replaced by its abstraction. Here, abstract inner(IO) is abstraction of IO variables of inner loop and abstract touter(IO) is abstraction of IO variable of outer loop (which also includes IO variable of inner loop).

DETAILED EXAMPLES

The below examples are provided to showcase the exemplary process. The property verification of the computer program is provided below. One part of verification involved model checking of properties. The model checker tool was not able to verify properties due to complex loops with unknown or large bounds of loop.

Below is an Example that Illustrates the Loop Abstraction:

```
1.  j=0,p=0,l=0,st=0;
2.  last=nondet( ); //nondet( ) returns a signed random value
3.  max=unondet( ); //unondet( ) returns an unsigned random value
```

```
4.      while (1)
5.      {
6.              st = 1;
7.              for (l=0; l< max ; l++)
8.              {
9.
10.                     if (l==last )
11.                             st = 0;
12.             }
13.             if(st == 0 && l == last +1)
14.                     j+=3; p+=3;
15.             else if (st ==1)
16.                     {
17.                             j++;
18.                             p++;
19.                     }
20.             else {
21.                     j+=2;
22.                     p+=2;
23.             }
24.             if (l == last && st == 0)
25.                     j = j+1;
26.             assert(j==p && max == l) ;
27.     }
```

Example A

Section of the Original Code

```
1.  l0 = l;
2.  for(t=0;t<1&&l<max;t++){
3.      k1 = nondet( );
4.      assume(k1>=0);
5.      l = l0 +k1;
6.      assume(l < max);
7.      if (l==last )
8.          st = 0;
9.      l++;
10. }
11. assume(!(l < max));
```

Example B

An Abstract Loop (iloop_absbody)

```
1.  j=0,p=0,l=0,st=0;
2.  last=nondet( ); max=nondet( );
/* Base Case */
3.  st = 1;
<iloop_absbody>
4.      if(st == 0 && l == last +1)
5.      {
6.                  j+=3; p+=3;
7.      }
8.      if (st ==1) {
9.          j++;
10.         p++;
11.     }
12.     else {
13.         j+=2;
14.         p+=2;
15.     }
16.     if (l == last && st == 0)
17.         j = j+1;
18.     assert(j==p && l == max) ;
19.
            /* k^{th} iteration*/
20. for (t1 =0, l0 = l, j0 = j, p0 = p; t1<1 ; t1++) {
21.     k1 = nondet( ); k = nondet( ); k2 = nondet( );
        k3 = nondet( ); k4 = nondet( ); k5 = nondet( ); j = j0 + k2 + 2*k3 +
        3*k5 + k4 ; p = p0 + k2 + 2*k3 + 3*k5;
22.         l = l0 + k1;
23.         __CPROVER__assume( k>=1 && k1>=0 &&
        k2 >= 0 && k3>=0 && k4>=0 && k5 >=0 );
24.         __CPROVER__assume( k == k2+k3+k5 && k4 <= k);
25.         st = 1;
26.         // Abstraction of inner loop only recurrence
27.         for(t=0;t<2 && l<max ;t++) {
28.             k1 = nondet( );
29.             __CPROVER__assume(k1>=0) ;
30.             l = l0 +k1;
31.             __CPROVER__assume(l < max);
32.             if (l==last )
33.                         st = 0;
34.             l++;
35.         }
36.         __CPROVER__assume(!(l < max));
37.         // Inner loop abstraction ended
38.         if(st == 0 && l == last +1)
39.         {
40.                     j+=3; p+=3;
41.         }
42.         else if (st ==1)
43.         {
44.             j++;
45.             p++;
46.         }
47.         else {
48.             j+=2;
49.             p+=2;
50.         }
51.         if (l == last && st == 0)
52.                 j = j+1;
53.         __CPROVER__assume(j==p && l == max) ;
54.     }
                /*(k+1)^{th} Loop iteration*/
55. st = 1;
56. <iloop_absbody>
57. if(st == 0 && l == last +1)
58.     {
59.                 j+=3; p+=3;
60.     }
61.     else if (st ==1)
62.     {
63.         j++;
64.         p++;
65.     }
66.     else {
67.         j+=2;
68.         p+=2;
69.     }
70.     if (l == last && st == 0)
71.                 j = j+1;
72.     assert(j==p && l == max) ;
```

Example C

The Abstracted Code

The technique is explained for the example C code shown in Example A. It shows the original C code with a nested loop and an assertion and the corresponding abstracted code. Since assert lies outside the inner for loop (lines 7-12 of Example A), it is abstracted using loop replacement as shown in Example B of the example. The loop is replaced by another loop with two iterations as it has two blocks. The inner loop has one IO variable l that is part of a recurrence equation l++. It is therefore accelerated using the non-deterministic equation l=l+k1, where k1 is assigned a non-deterministic value representing the number of iterations that the original loop has taken. Inner loop abstraction body is referred as <iloop_absbody> in the abstracted code Example C.

The property of interest, the assertion at line 26 of Example A, lies within the outer loop and hence induction is applied to the outer loop. Lines 3-20 of the code in Example C check whether the assert holds at the end of the base case for induction. The inductive step is encoded by lines 20-54, where it is assumed the loop has executed k times. The outer loop has IO variables l, j and p, which are given accelerated values l=10+k1; j=j0+k2+2*k3+k4+3*k5 and p=p0+k2+2*k3+3*k5 respectively at the end of the kth iteration. k2, k3, k4 and k5 are the number of times the bodies of the 'else if' construct at line 42, 'else' at line 47, 'if' at line 51 and 'if' at line 38 are executed at the end of k iterations. j0 and p0 are the initial values of j and p respectively. Line 53 encodes the assumption that the property holds at the end of k iterations. Lines 55-72 encode the (k+1)th iteration including the assert.

The abstracted code is successfully verified by a model checker, for example the model checker may be a bounded model checker in this case. In the abstracted code, the state space of the variables j and p is a super set of that in the concrete code making it a sound over-approximation. The loop abstraction process uses all three transformations—abstraction, acceleration and induction, to verify this code. In comparison, none of the commercially available tools (available model checkers, commercially available static analysis tools) were able to verify the original code.

Although implementations for loop abstraction in a program have been described in language specific to structural features and/or methods, it is to be understood that the appended claims are not necessarily limited to the specific features or methods described. Rather, the specific features and methods are disclosed as exemplary implementations for loop abstraction.

We claim:

1. A system for loop abstraction in a source code, for model checking of the source code, the system comprising:
   a context expansion module coupled to the processor to,
      receive the source code for abstraction;
      determine an original loop within the source code, wherein the original loop includes a control statement and a loop body, wherein the original loop causes the loop body to be repeatedly executed based on the control statement; and
      identify output variables in the original loop and a number of blocks associated with the original loop, wherein the output variables includes input-output variables and pure output variables, wherein the input-output variables are indicative of variables read and modified in the original loop, and wherein the number of blocks is indicative of a count of unconditionally executed statement sets in which at least one output variable is computed; and
   a loop abstraction module coupled to the processor to generate an abstract loop corresponding to the original loop, wherein to generate the abstract loop the loop abstraction module is further configured to:
      add a modified expression for accelerated assignment of each output variable in a first subset of the output variables, wherein the modified expression is added before the loop body; and
      replace the control statement with a bounded control statement, wherein the bounded control statement includes an upper bound based on the number of blocks and count of a second subset of the output variable; and
      replace the original loop with the abstract loop to generate an abstract source code for the model checking.

2. The system for loop abstraction in a source code as claimed in claim 1, wherein the pure output variables are indicative of variables read and modified in the original loop, and the pure output variables are indicative of variables modified without being read in the original loop, and wherein the first subset of the output variables corresponds to the input-output variables and the second subset of the output variables corresponds to pure output variables.

3. The system for loop abstraction in a source code as claimed in claim 2, wherein the upper bound in the bounded control statement is a deterministic bound value computed based on a number of unconditionally executed statement sets in which at least one output variable is computed and the number of pure output variables.

4. The system for loop abstraction in a source code as claimed in claim 1, wherein the loop abstraction module configured to
   determine that an assertion statement is placed inside the original loop; and
   apply induction to generate the abstract loop.

5. The system for loop abstraction in a source code as claimed in claim 1, wherein for the accelerated assignment of a non-recurrent output variable, the loop abstraction module is further configured to formulate the value of the non-recurrent output variable as a function of an initial value of the non-recurrent variable, a number of reset expression for the non-recurrent variable, and the reset values of the reset expressions.

6. The system for loop abstraction in a source code as claimed in claim 1, wherein for the accelerated assignment of a self recurrent output variable, the loop abstraction module is further configured to formulate the value of the self recurrent output variable as a function of, among other parameters an initial value of the self recurrent output variable, a number of computations modifying the self recurrent output variable, and a number of times of execution of the computations in the original loop.

7. The system for loop abstraction in a source code as claimed in claim 1, further comprising:
   a model checker coupled to the processor to generate an error message for the abstract loop, wherein the error message corresponds to an occurrence of an error while model checking the abstract loop; and
   the context expansion module configured to regenerate the abstract loop in an expanded context, wherein the expanded context comprises execution statements outside the original loop that cause the original loop to be executed.

8. A method, implemented by a computer, for abstracting a loop in a source code, for model checking of the source code, the method comprising:
   receiving the source code for abstraction;
   determining an original loop within the source code, wherein the original loop includes a control statement and a loop body, wherein the original loop causes the loop body to be repeatedly executed based on the control statement;
   identifying output variables in the original loop and a number of blocks associated with the original loop, wherein the output variables includes input-output variables and pure output variables, wherein the input-output variables are indicative of variables read and modified in the original loop, and wherein the number of blocks is indicative of a count of unconditionally executed statement sets in which at least one output variable is computed;
   generating an abstract loop corresponding to the original loop, wherein the generating the abstract loop comprises:

adding a modified expression for accelerated assignment for each output variable in a first subset of the output variables, wherein the modified expression is added before the loop body; and replacing the control statement with a bounded control statement, wherein the bounded control statement includes an upper bound based on the number of blocks, and count of a second subset of the output variable; and replacing the original loop with the abstract loop for generating an abstract source code for the model checking.

9. The method as claimed in claim 8, wherein the pure output variables are indicative of variables read and modified in the original loop, and the pure output variables are indicative of variables modified without being read in the original loop, and wherein the first subset of the output variables corresponds to the input-output variables and the second subset of the output variable corresponds to the pure output variables.

10. The method as claimed in claim 9, wherein the upper bound in the bounded control statement is a deterministic bound value computed based on a number of unconditionally executed statement sets in which at least one output variable is computed and the number of pure output variables.

11. The method as claimed in claim 8, wherein the generating the abstract loop comprises:
determining that an assertion statement is placed inside the original loop; and
applying induction for generating the abstract loop.

12. The method as claimed in claim 8, wherein the accelerated assignment of a non-recurrent output variable comprises formulating the value of the non-recurrent output variable as a function of an initial value of the non-recurrent variable, and a number of reset expression for the non-recurrent variable, and the reset values of the reset expressions, wherein the non-recurrent output variable is a function of a constant.

13. The method as claimed in claim 8, wherein the accelerated assignment of a self recurrent output variable comprises formulating the value of the self recurrent output variable as a function of, among other parameters, initial value of the self recurrent output variable, a number of computations modifying the self recurrent output variable, and a number of times of execution of the computations in the original loop, wherein the self recurrent output variable is a function of a constant and the self recurrent output variable.

14. The method as claimed in claim 8 further comprising,
receiving an error message for the abstract loop from a model checker, wherein the error message corresponds to an occurrence of an error while model checking the abstract loop; and
regenerating the abstract loop in an expanded context, wherein the expanded context comprises execution statements outside the original loop that cause the original loop to be executed.

15. The method as claimed in claim 8, wherein the generating the abstract loop comprises generating the abstract loop for each nested loop in the original loop starting from an innermost nested loop.

16. A non-transitory computer-readable medium having embodied thereon a computer program for executing a method, for abstracting a loop in a source code, for model checking of the source code, the method comprising:
receiving the source code for abstraction;
determining an original loop within the source code, wherein the original loop includes a control statement and a loop body, wherein the original loop causes the loop body to be repeatedly executed based on the control statement;

identifying output variables in the original loop and a number of blocks associated with the original loop, wherein the output variables includes input-output variables and pure output variables, wherein the input-output variables are indicative of variables read and modified in the original loop, and the pure output variables are indicative of variables modified without being read in the original loop, and wherein the number of blocks is indicative of a count of unconditionally executed statement sets in which at least one output variable is computed;

generating an abstract loop corresponding to the original loop, wherein the generating the abstract loop comprises:
adding a modified expression for accelerated assignment for each output variable in a first subset of the output variables, wherein the modified expression is added before the loop body; and
replacing the control statement with a bounded control statement, wherein the bounded control statement includes an upper bound based on the number of blocks and count of a second subset of the output variables; and replacing the original loop with the abstract loop for generating an abstract source code for the model checking.

17. The non-transitory computer-readable medium, as claimed in claim 16, wherein the generating the abstract loop comprises:
determining that an assertion statement is placed inside the original loop; and
applying induction for generating the abstract loop.

18. The non-transitory computer-readable medium, as claimed in claim 16, wherein the accelerated assignment of a non-recurrent output variable, wherein the non-recurrent output variable is a function of a constant, comprises
formulating the value of the non-recurrent output variable as a function of initial value of the non-recurrent variable, and number of reset expression for the non-recurrent variable, and the reset values of the reset expressions, while the non-recurrent variable is a function of constants.

19. The non-transitory computer-readable medium, as claimed in claim 16, wherein the accelerated assignment of a self recurrent output variable comprises formulating the value of the self recurrent output variable as a function of, among other parameters, initial value of the self recurrent output variable, a number of computations modifying the self recurrent output variable, and a number of times of execution of the computations in the original loop, wherein the self recurrent output variable is a function of a constant and the self recurrent output variable.

20. The non-transitory computer-readable medium, as claimed in claim 16 further comprising,
receiving an error message for the abstract loop from a model checker, wherein the error message corresponds to an occurrence of an error while model checking the abstract loop; and
regenerating the abstract loop in an expanded context, wherein the expanded context comprises execution statements outside the original loop that cause the original loop to be executed.

* * * * *